US006584662B1

(12) United States Patent
Krick

(10) Patent No.: US 6,584,662 B1
(45) Date of Patent: Jul. 1, 2003

(54) EXTRACTOR TOOL FOR A GLOW PLUG

(76) Inventor: Daphne Krick, 816 Ashboro St., Fayetteville, NC (US) 28311

( * ) Notice: Subject to any disclaimer, the term of this patent is extended or adjusted under 35 U.S.C. 154(b) by 0 days.

(21) Appl. No.: 10/298,446

(22) Filed: Nov. 18, 2002

(51) Int. Cl.[7] .................................................. B23P 19/04

(52) U.S. Cl. ............................. 29/263; 29/244; 29/265; 29/272; 29/280; 81/53.12; 81/53.2

(58) Field of Search .......................... 29/255, 254, 275, 29/263, 264, 283, 402.08, 402.63, 256, 258, 426.1, 426.5; 279/43.1, 2.02

(56) References Cited

U.S. PATENT DOCUMENTS

| | | | | |
|---|---|---|---|---|
| 2,900,619 A | | 8/1959 | White | |
| 3,305,921 A | * | 2/1967 | Morse | 29/229 |
| 3,529,497 A | | 9/1970 | Brooks | |
| 3,727,491 A | | 4/1973 | Buckwalter | |
| 4,079,494 A | | 3/1978 | Sutton et al. | |
| 4,982,488 A | * | 1/1991 | Ragsdale, Sr. | 29/263 |
| D370,608 S | * | 6/1996 | Wagner | D8/51 |
| 5,604,967 A | | 2/1997 | McMahon | |
| 5,682,660 A | | 11/1997 | Hansen | |
| 5,802,692 A | * | 9/1998 | Philippe | 29/263 |
| 6,092,279 A | | 7/2000 | Shoup | |
| 6,148,492 A | | 11/2000 | Gaulden | |
| 6,185,804 B1 | * | 2/2001 | Burns et al. | 29/426.1 |
| 6,189,416 B1 | | 2/2001 | Groom | |
| 6,427,303 B1 | * | 8/2002 | McConnell et al. | 29/255 |

* cited by examiner

*Primary Examiner*—Joseph J. Hail, III
*Assistant Examiner*—Daniel Shanley
(74) *Attorney, Agent, or Firm*—Coats & Bennett, P.L.L.C.

(57) ABSTRACT

A tool for extracting a glow plug includes an externally threaded shaft, an internally threaded sleeve that engages the externally threaded shaft, and a fixed cavity formed in one end of the externally threaded shaft. The cavity has a side entry to permit the insertion of the glow plug into the cavity in a direction normal to the shaft, and a pair of opposing shoulders integrally formed in opposing sidewalls of the cavity to engage the glow plug. The sleeve threads down the shaft until it contacts the engine block. Rotating the sleeve exerts a pulling force on the shaft, which is transferred to the inserted glow plug by the opposing shoulders in the cavity. This pulls both the shaft and the inserted glow plug away from the engine block.

14 Claims, 4 Drawing Sheets

EXTRACTOR TOOL FOR A GLOW PLUG

BACKGROUND OF THE INVENTION

The present invention relates generally to specialty tools, and in particular, to an extraction tool for extracting a glow plug from an engine.

A glow plug is a device that helps some diesel engines start when the engine is cold. Typically, a lower portion of the glow plug extends through a glow plug hole in the engine block, and terminates in a cylinder chamber. During ignition, the lower portion of the glow plug heats the air in the cylinder chamber and helps to ignite the fuel. However, the tolerance between the lower portion of the glow plug and the glow plug hole is usually very small. Further, the repeated heating cycles experienced by the lower portion of the glow plug may cause the lower portion to warp and/or expand over time. As such, extracting the warped glow plug back through the glow plug hole often proves to be a difficult task that can require substantial amounts of force. This force, however, can also cause the glow plug to break during its removal, thereby necessitating the disassembly of certain parts of the engine to remove the glow plug pieces. Therefore, what is needed is a specialty tool that facilitates the removal of the used glow plugs from the engine.

SUMMARY OF THE INVENTION

A tool for extracting a glow plug includes an externally threaded shaft, an internally threaded sleeve that engages the externally threaded shaft, and a fixed cavity formed in one end of the externally threaded shaft. The cavity has a side entry to permit the insertion of the glow plug into the cavity in a direction normal to the shaft, and a pair of opposing shoulders integrally formed in opposing sidewalls of the cavity. The opposing shoulders engage the glow plug, and transfer a pulling force to the glow plug during extraction.

DETAILED DESCRIPTION OF THE INVENTION

Figure 1:
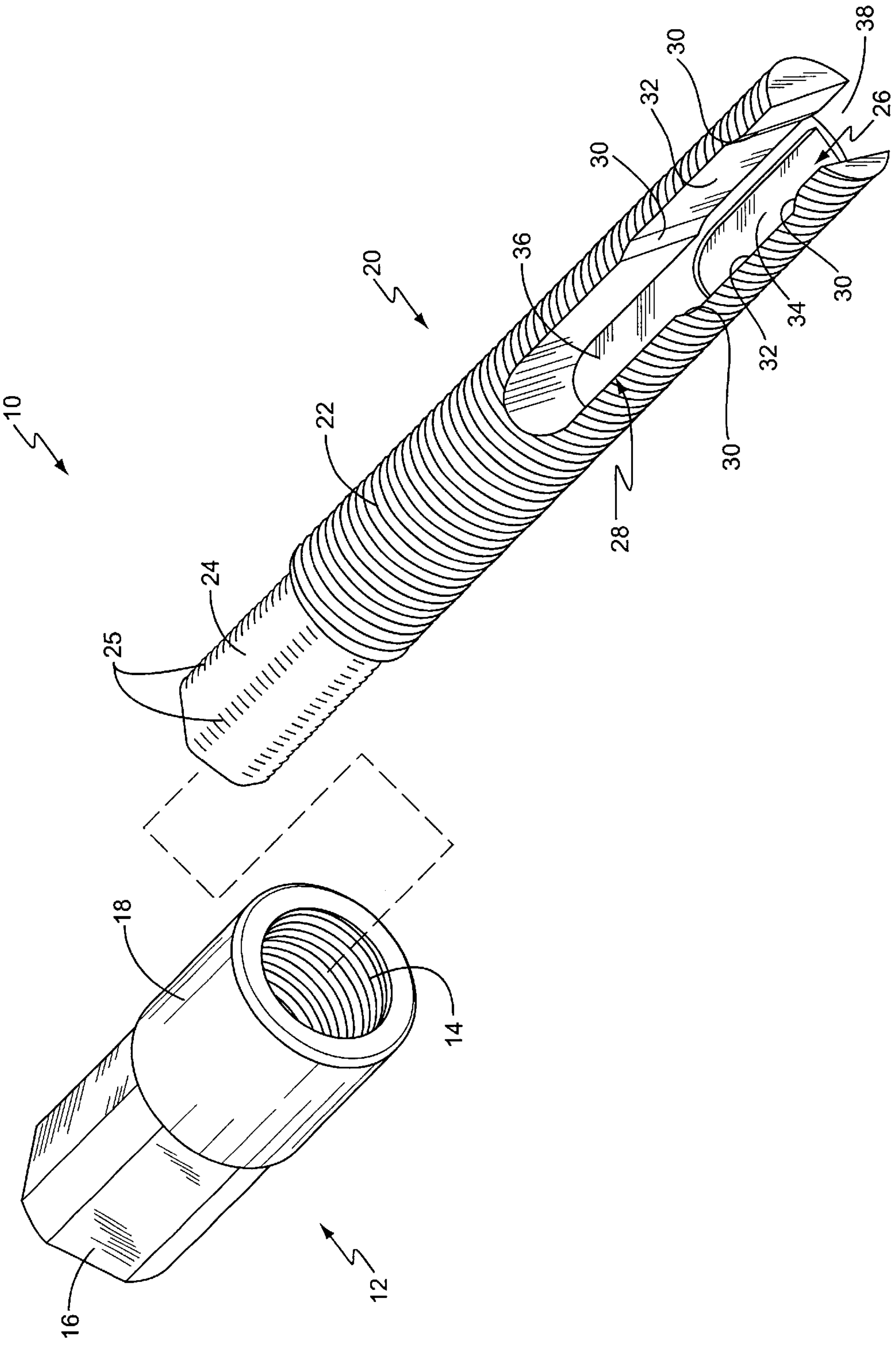
FIG. 1 illustrates one embodiment of the present invention.

Referring now to FIG. 1, the glow plug extractor tool is shown therein and indicated generally by the number 10. The glow plug extractor tool comprises an internally threaded sleeve 12 and an externally threaded shaft 20, both of which are preferably tooled as a single piece of a strong metal or metal alloy, such as steel or stainless steel. Sleeve 12 includes a sleeve-head 16 at one end, an opposing open-end 18 that fits over shaft 20, and internal threads 14 that mate with and engage external threads 22 on shaft 20. Shaft 20 comprises a head 24, a cavity 26 having a side entry 28, and a cutout or notch 38 formed in the end of shaft 20 opposite the side entry 28. A pair of opposing shoulders 30 are integrally formed in opposing sidewalls 32 of cavity 26, and a U-shaped depression 34 is integrally formed in a backwall 36 of the cavity 26.

In this embodiment, sleeve 12 is generally cylindrical in shape; although those skilled in the art will readily appreciate, that sleeve 12 may be tooled in any shape desired. Further, the core of sleeve 12 is hollow. Thus, shaft 20 may extend through and out the sleeve-head 16 end of sleeve 12 as it threads down the shaft 20.

The sleeve-head 16 may include one or more flats, adapted to be engaged by a wrench or similar tool, for rotating the sleeve 12 down the shaft 20 is rotated as will be hereinafter described. As shown in FIG. 1, the flats extend only partially the length of the sleeve 12, however, it should be understood that the flats might actually extend for any length of sleeve 12.

Shaft 20 is also generally cylindrical except for head 24, which preferably includes generally flat sides to facilitate grasping the head 24 with a wrench. The head 24 may include a plurality of grooves 25 notched into the protruding corners of head 24 to help prevent the wrench from slipping. In one embodiment, head 24 is hexagonal, although those skilled in the art will understand that head 24 may be formed in any shape that facilitates gripping and/or holding the shaft 20 by a gripping tool.

The external threads 22 of shaft 20 correspond to the internal threads 14 of sleeve 12, such that sleeve 12 threadingly mates with shaft 20. In FIG. 1, external threads 22 extend substantially the length of shaft 20. Thus, placing the open-end 18 of sleeve 12 over the head 24 of shaft 20, and rotating sleeve 12 clockwise, for example, causes the sleeve 12 to travel down shaft 20. However, those skilled in the art will readily appreciate that the external threads 22 may extend for any length of shaft 20, and further, shaft 20 may or may not be reverse threaded. Therefore, there is no requirement as to which way (i.e., clockwise or counter-clockwise) sleeve 12 is turned to thread it down shaft 20, so long as the external threads 22 correspond to the internal threads 14.

Generally, the dimensions of sleeve 12 and shaft 20 are not important. In one embodiment, however, sleeve 12 is approximately 2 inches in length, has an outer diameter of about ⅞ of an inch, and an inner diameter of approximately ⅝ of an inch. Shaft 20 has a length of approximately 4 inches, and an outer diameter (at the external threads 22) of about 9/16 of an inch. The cavity 26 extends about 1-¾ of an inch from the end of the shaft 20, and further, is approximately ⅜ inches wide at its widest point. The notch 38 is approximately 5/16 of an inch wide, and extends about 3/16 of an inch from the end of shaft 20. Thus, in this embodiment, shaft 20 is about twice the length of sleeve 12, and sleeve 12 is slightly longer than cavity 26.

As those skilled in the art should readily appreciate, the measurements of the sleeve 12 and shaft 20 are unimportant, and they may actually be tooled to any size desired. However, the inner diameter of the sleeve 12 is preferably slightly larger than the widest circumference of shaft 20, while it's length is preferably shorter than that of shaft 20. Further, cavity 26 and notch 38 may be sized as desired to receive glow plugs of various sizes and manufacture.

Figure 2:
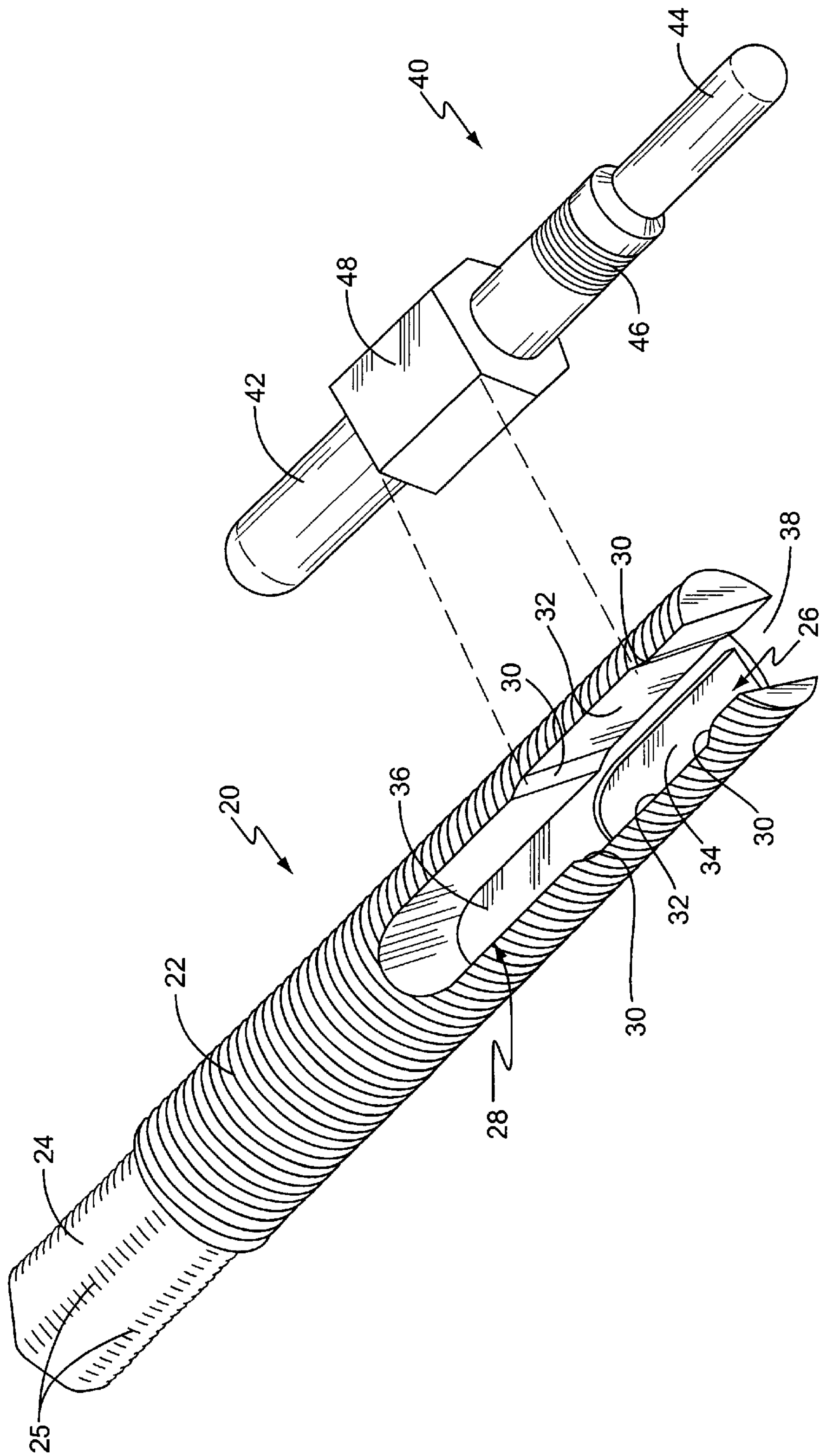
FIG. 2 illustrates the shaft of one embodiment of the present invention together with a possible exemplary glow plug.

FIG. 2 illustrates the cavity 26 and an exemplary glow plug 40 in more detail. While the glow plug 40 itself is not claimed by the present invention, and is well known in the art, a brief description is included herein merely for context.

Glow plug 40 includes an upper portion 42 that connects to an electrical source (not shown) on the diesel engine, a lower portion 44 that extends through a glow plug hole in the engine block, and threads 46 to secure glow plug 40 to corresponding threads in the glow plug hole. A glow plug hex nut 48 permits a user to engage the glow plug 40 with the gripping tool to tighten or loosen the glow plug 40 from the glow plug hole. Typically, an electrical conductor (not shown) extends from the upper portion 42 through the glow plug 40, and terminates in a heating coil (not shown) in the lower portion 44 of glow plug 40. The electrical source connects to the upper portion 42, and causes the coil in the lower portion 44 to heat up, thereby heating the air in the cylinder chamber and helping to ignite the fuel when the engine is cold.

The cavity 26 is formed as a void at one end of shaft 20, and extends longitudinally through at least a portion of the shaft 20. As stated above, the side opening 28 of cavity 26 permits the extractor tool 10 to easily engage the glow plug 40 from any side. That is, the side opening 28 permits the insertion of the glow plug 40 into the cavity 26 in direction normal to the shaft 20. Inserting the glow plug 40 in the manner of the present invention not only deviates from conventional insertion methods, but also, facilitates the maneuverability and ease of use of the extractor tool 10 in the engine area. Thus, extractor tool 10 may engage the glow plug 40 from any side direction, wherein current glow plug extractor tools engage the glow plug 40 from only one direction.

Facilitating the insertion of glow plug 40 into cavity 26 are the opposing shoulders 30 integrally formed in the first and second sidewalls 32 of the cavity 26. The opposing shoulders 30 receive the glow plug hex nut 48, such that the shoulders 30 bound the top and bottom of the inserted glow plug hex nut 48. As will be explained later in more detail, the opposing shoulders 30 transfer a pulling force to the hex nut 48 when extractor tool 10 is employed to extract glow plug 40 from the engine block.

The U-shaped depression 34, integrally formed in the backwall 36, provides clearance for the protruding corners of the glow plug hex nut 48, while notch 38, which is formed opposite the side entry 28, allows the glow plug 40 to be inserted more deeply into the cavity 26. In this embodiment, the U-shaped depression 34 is generally U-shaped, hence, the name assigned here. However, this term is merely used for illustrative purposes, and indeed, it need not be U-shaped. Those skilled in the art will understand that the U-shaped depression 34 can actually be milled in any shape and/or size required. However, U-shaped depression 38 should be deep enough to permit the hex nut 48 to be accommodated within cavity 26. This will allow sleeve 12 to thread completely down shaft 20 without being impeded by the protruding glow plug hex nut 48.

Figure 3:
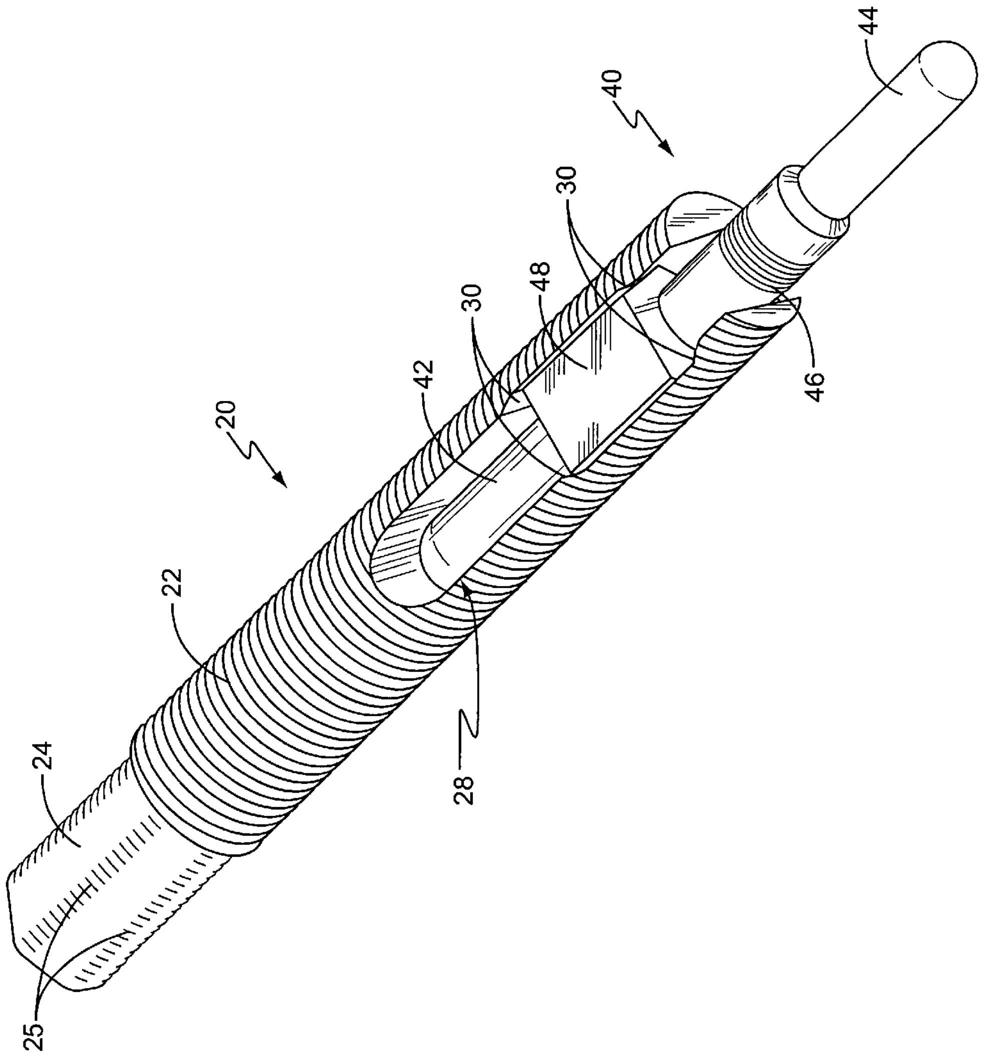
FIG. 3 illustrates a possible exemplary glow plug inserted into the cavity of the shaft of one embodiment of the present invention.

FIG. 3 illustrates the exemplary glow plug 40 inserted into the cavity 26 of shaft 20. In FIG. 3, the upper portion 44 of glow plug 40 lies within the cavity 26, while the top and bottom of hex nut 48 sit securely between the opposing shoulders 30. Further, the glow plug hex nut 48 lies completely within the cavity 26, and therefore, will not interfere with sleeve 12 as it threads down shaft 20. Thus, the opposing shoulders 30, the U-shaped depression 34, and the notch 38 all cooperate to permit the extractor tool 10 to better grip the glow plug 40 by allowing more of the glow plug 40 to insert into the cavity 26.

Figure 4:
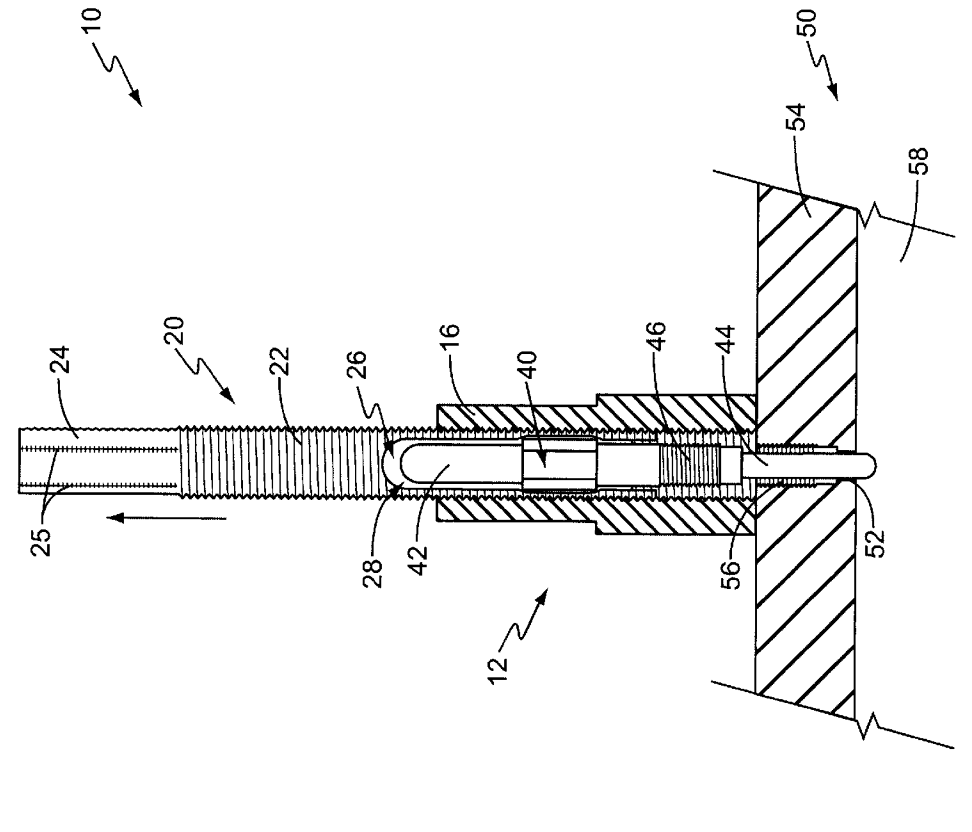
FIG. 4 illustrates a possible exemplary use of one embodiment of the present invention.

FIG. 4 illustrates a possible exemplary use of extractor tool 10. When glow plug 40 needs replacement, a user must first fully loosen glow plug 40 from the glow plug hole 52. Using a wrench or a socket, for example, to grip the glow plug hex nut 48, the user rotates glow plug 40 in a direction such that the glow plug threads 46 completely disengage from the corresponding glow plug hole threads 56. Despite being fully loosened, however, glow plug 40 may still be bound in engine block 50, as the lower portion 44 of glow plug 40 may have expanded and/or warped over time. This expansion and/or warping may disfigure the lower portion 44 of the glow plug 40, such that the lower portion 44 can no longer fit through the glow plug hole 52. Thus, the user may employ the extractor tool 10 of the present invention.

The user inserts glow plug 40 into the cavity 26 of shaft 20, by aligning the side entry 28 with the loosened glow plug 40, and the opposing shoulders 30 with the glow plug hex nut 48. Once aligned, the user slides the shaft 20 onto the glow plug 40 from the side, such that the glow plug 40 inserts into cavity 26 in a direction normal to the shaft 20. When correctly inserted, the upper portion 42 of the inserted glow plug 40 lies substantially within the U-shaped cavity 26, and the shoulders 30 bound the top and bottom of the glow plug hex nut 48. As seen in FIG. 4, the glow plug threads 46 remain outside the confines of the cavity 26, while the lower portion 44 of the glow plug 40 remains lodged in the cylinder chamber 58. The user then places the open-end 18 of sleeve 12 over the head 24 of shaft 20 and, holding the shaft 20 to prevent it from turning, rotates the sleeve 12 such that sleeve 12 threads down shaft 20 and into contact with engine head 54.

As those skilled the art will understand, the user may thread the sleeve 12 onto the shaft 20 in many ways. For example, the user may use his or her fingers to initially thread the sleeve 12 down shaft 20 and into contact with head 54. Alternatively, the user may employ other tools as appropriate. Further, it is not required to insert glow plug 40 into cavity 26 prior to threading the sleeve 12 onto the shaft 20. In fact, the user may find it useful to partially thread the sleeve 12 down shaft 20 prior to inserting glow plug 40 into the cavity 26. Then, after the glow plug 40 is properly inserted, the user can thread the sleeve 12 down the remaining portion of the shaft 20. Thus, the extractor tool 10 provides an advantage over current tools in that it does not require any assembly within the engine area.

As stated above, once sleeve 12 is threaded onto shaft 20, the user rotates sleeve 12 so that the sleeve 12 threads completely down shaft 20 until the open-end 18 portion of sleeve 12 contacts the engine head 54. Upon contact, the sleeve 12 completely covers the side entry 28 of cavity 26, and thereby prevents glow plug 40 from disengaging itself from the cavity 26. The user may then employ a first gripping tool to grasp the head 24 of shaft 20 and stabilize shaft 20, while using a second gripping tool to grasp the sleeve-head 16. The user then continues to rotate the sleeve 12. As sleeve 12 is in contact with the engine head 54, it is prohibited from threading down shaft 20 any further. However, the torque applied by the user to the sleeve 12 causes shaft 20 to begin to thread up and out sleeve 12, such that shaft 20 pulls away from engine head 54. As shaft 20 pulls away, the opposing shoulders 30 impart a pulling force to the glow plug hex nut 48, and slowly extract the lower portion 44 through and out the glow plug hole 52. Once the glow plug 40 is completely extracted from the glow plug hole 52, the user removes the sleeve 12 from over the side entry 28 of cavity 26, and removes glow plug 40 from the cavity 26.

The present invention may of course, be carried out in other specific ways than those set forth herein without departing from the essential characteristics of the invention. The present embodiments are therefore to be considered in all respects as illustrative and not restrictive, and all changes coming within the meaning and equivalency range of the appended claims are intended to be embraced therein.

What is claimed is:

1. A tool for extracting a glow plug comprising:

an externally threaded shaft;

an internally threaded sleeve to engage said externally threaded shaft;

a fixed cavity fixed first and second side walls formed in one end of said shaft to receive the glow plug, said cavity having a side entry to permit the insertion of the glow plug into said cavity in a direction normal to said shaft.

2. The tool of claim 1 wherein said cavity includes a pair of opposing shoulders integrally formed in first and second opposing sidewalls of said cavity.

3. The tool of claim 2 wherein said opposing shoulders engage the glow plug, and transfer a pulling force to the glow plug.

4. The tool of claim 2 wherein said cavity includes a U-shaped depression integrally formed in a third sidewall of said cavity to provide clearance for the glow plug nut when the glow plug is inserted into said cavity.

5. The tool of claim 1 further comprising a notch formed in said one end of said shaft opposite said side entry.

6. The extraction tool of claim 1 wherein said cavity is substantially U-shaped.

7. The tool of claim 1 wherein said shaft further includes a head at an end opposing said opening.

8. The tool of claim 1 wherein said external threads extend for substantially the length of said shaft.

9. A tool for extracting a glow plug comprising:

an externally threaded shaft;

an internally threaded sleeve to engage said externally threaded shaft;

a fixed cavity fixed first and second side walls formed in one end of said shaft to receive the glow plug; and a pair of opposing shoulders integrally formed in first and second opposing sidewalls of said cavity to engage the glow plug, and transfer a pulling force to the glow plug.

10. The extraction tool of claim 9 wherein said cavity has a side entry to permit the insertion of the glow plug into said cavity in a direction normal to said shaft.

11. The extraction tool of claim 10 wherein said cavity includes a U-shaped depression integrally formed in a third sidewall of said cavity to provide clearance for the glow plug nut when the glow plug is inserted into said cavity.

12. The extraction tool of claim 9 further comprising a notch formed in said one end of said shaft opposite said side entry.

13. The tool of claim 9 wherein said shaft further includes a head at an end opposing said opening.

14. The extraction tool of claim 9 wherein said cavity is substantially U-shaped.

* * * * *